March 12, 1968  T. A. JOHANSSON  3,372,610
ROTARY CUTTING TOOL
Filed Oct. 22, 1965
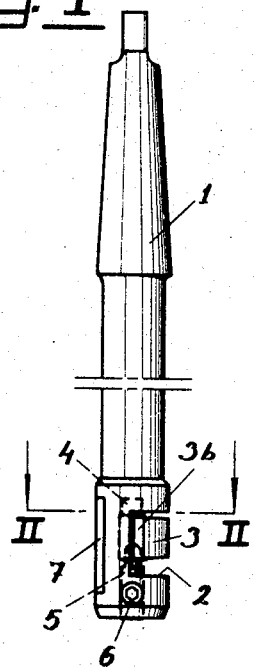
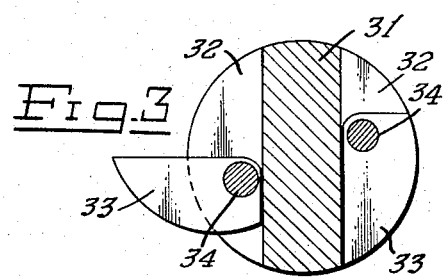
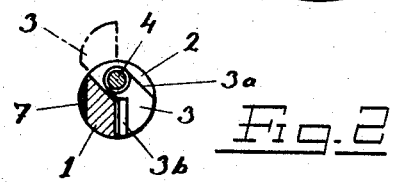

ROTARY CUTTING TOOL
Ture Axel Johansson, Inagogatan 12, Goteborg, Sweden
Filed Oct. 22, 1965, Ser. No. 502,089
4 Claims. (Cl. 77—58)

ABSTRACT OF THE DISCLOSURE

A rotary cutting tool in which a cutter is arranged swingable about a pivot eccentrically located in relation to the axis of rotation of the tool in such a manner that the cutter will be swung out to a working position due to centrifugal action. The cutter is located in a transverse recess in a spindle constituting the main part of the tool and to make possible an easy exchange of the cutter, the recess is longer in the axial direction of the spindle than the thickness of the cutter. One part of the spindle is integral with the cutter and the combined length of this pivot part and the thickness of the cutter is less than the axial length of the recess. The remaining part of the spindle includes a pin insertable through a bore in the spindle and retained therein in any suitable manner.

---

This invention relates to a rotary cutting tool especially for countersinking of a through-bore on the back side of a workpiece.

An object of the invention is to provide a tool of this kind which tool is very simple in structural detail, inexpensive to manufacture and simple to use and which makes quick working possible.

Cutting tools having swingable cutters are known in the art but these tools rely to a great extent on spring means for retracting the cutters into the body of the tool. Such an arrangement makes the assembly difficult and the cutters are improperly supported in the body. By having one part of the spindle integral with the cutter and the other part as a separate pin, an easy mounting of the cutter within an enlarged recess is possible.

Further objects and advantages of the invention will become more readily apparent from the following detailed description and annexed drawings and in which drawings:

FIGURE 1 is a view in side elevation of a tool provided with one cutter blade and adapted for the planing of the back sides of a bore extending through a workpiece, FIGURE 2 is a transverse sectional line taken along the line II—II of FIGURE 1 the view looking in the direction of the arrows, and FIGURE 3 is a view in section taken through a tool provided with two cutters.

As can be seen from the drawing the new tool comprises a spindle 1 which in a known manner is formed with an upper conical end portion by which the tool can be attached to a drilling machine or the like. The lower part of the spindle is provided with a recess 2 formed as a sector of a circle in which a cutter 3 of less axial length than the recess 2 is arranged. The end portion of the cutter 3 adjacent the conical end of the spindle 1 is provided with a pivot point 4 formed integrally with the cutter and arranged in parallelism to the axis of rotation of the spindle, the pivot part 4 which is journalled in a corresponding bore in the spindle. In the opposite end portion of the cutter 3 is formed a bore which is co-axial with the pivot 4 and into which bore the end of a pin 5 extends. This pin has a screw threaded portion, which fits into a corresponding screw-threaded bore in the lower part of the spindle 1. The end of the pin 5 extending into the bore in the cutter 3 may, as shown in FIG. 1, be formed with a conical end surface so that both the axial and the radial clearance of the cutter 3 can be adjusted by screwing the pin against a correspondingly shaped conical bottom surface in said bore in the cutter. To make it possible to fix the pin 5 in any desired position, a locating screw 6 directed radially in relation to the pin is arranged in a corresponding screw-threaded bore in the lower part of the spindle 1. The pivot part 4 which, is formed integral with the cutter 3 is somewhat shorter than the difference in axial length between and recess 2 and the thickness of the cutter 3, so that, when removing the pin 5 and moving the cutter 3 downwards in the recess, the pivot part 4 can be removed from its corresponding bore and the cutter withdrawn.

As shown in FIG. 2, the cutter 3 is swingable between two positions about the pivot part 4 and the pin 5 which are eccentrically positioned in relation to the axis of rotation of the spindle 1. In the position shown in full lines in FIGS. 1 and 2, the cutter is located entirely within the circumferential surface of the spindle 1. If, however, the cutter 3 is swung 180° anti-clockwise in FIG. 2, the cutter will assume the position indicated by dot-dash lines, in which position a stop-face 3a formed on the cutter will abut a longitudinal side surface of the recess 2. The stop-face will prevent the cutter from being swung out of position in anti-clockwise direction when the cutter is brought into contact with the workpiece during the rotation of the spindle 1 in the clockwise direction.

When a tool will be used for the countersinking of a through-bore on the back side of a workpiece, for example the back side of a pipe flange, the appropriate tool shall have a diameter essentially corresponding to the diameter of the bore. This tool may be attached to a drilling machine or other suitable machine by means of which it will be brought into the existing bore in the workpiece while rotating the tool in the anti-clockwise direction. The cutter will then automatically be swung into the recess 2 in the spindle 1 when the cutter during the movement of the tool towards the workpiece is brought into contact with the adjacent end of the bore. When the cutter has passed through the bore the direction of rotation is reversed so that the cutter 3 will be swung outwards by centrifugal force to the position indicated by dotted lines in FIG. 2. Thereafter the cutter can be brought into working contact with the back side of the workpiece. When the countersinking operation is finished, the direction of rotation is again reversed so that the cutter 3 is swung into the recess 2 in the spindle 1 allowing the tool to be withdrawn from the bore in the workpiece.

In this embodiment, the tool is intended for comparatively small tool diameters and due to the limited space only one cutter used. However, this has no detrimental influence on the cutting operation because the lower end portion of the spindle is governed by the bore in the workpiece during the operation. In order to minimize the wear of said end portion of the spindle, and which wear is caused by the contact between said end portion and the interior surface of the bore, the spindle is provided with an insert 7 of hard carbide steel. The cutter 3 can be provided with an insert 3b of hard carbide steel which constitutes the cutting edge.

With larger diameter tools, two or more cutters may, of course, be mounted each in its recess in the spindle. In the embodiment illustrated the cutting edge is arranged at the upper radial side of the cutter. However, this may also be designed for milling work in places which are difficult to reach.

Referring to FIGURE 3, there is disclosed a tool provided with two cutters. It will be noted that spindle 31 at the relevant portion is provided with two recesses 32. Cutters 33 provided with integral pivot parts 34 and are so shaped that the cutters in the inwardly swung position rest completely wthin the circumference of the spindle. In working positions, one side of each cutter is supported by the internal wall of the recess. Furthermore, these cutters may be designed to perform milling work.

It will be understood that tools of the kind hereinbefore described can be formed to make countersinkings of many different shapes and also to be used for milling work in places which are very difficult of access. When the tool is used for such work it can even be arranged for radially feeding if the outer edges of the cutters are ground for cutting work.

The invention is not to be confined to any strict conformity to the showings in the drawings but changes or modifications may be made therein so long as such changes or modifications mark no material departure from the spirit and scope of the appended claims.

What I claim is:

1. A rotary cutting tool, especially for countersinking of a through-bore on the back side of a workpiece, including a spindle having opposite ends, one of said ends being adapted to be attached to a tool holder, the spindle in proximity to the other end having a transverse recess therein, at least one cutter arranged in said transverse recess and swingable about an axis eccentric to the axis of rotation of the spindle so that upon rotation of the spindle in a clockwise direction the cutter is swung into the recess to a position within the circumferential surface of the spindle and on rotation in an anti-clockwise direction the cutter is swung from the recess to a position outside the circumferential surface of the spindle said recess being formed with a larger axial width than the cutter, said cutter having an axially extending pivot member with the ends of said pivot member being fitted in bores in the transverse end surfaces of the recess, said pivot member of the cutter being formed in two parts, one of which parts is formed integrally with the cutter and is provided with a length corresponding to the exceeding axial width of the recess, the other of which part is formed as a separate pin, arranged in one of said bores in the spindle and movable into a corresponding bore in the cutter.

2. The rotary cutting tool as claimed in claim 1 wherein the pin is provided with an axially exposed surface adapted to serve as an abutment to hold the cutter in a predetermined axial position.

3. The rotary cutting tool as claimed in claim 2 wherein the pin is provided with a screw-threaded portion and arranged in a threaded bore in the spindle.

4. The rotary cutting tool as claimed in claim 3 wherein the spindle is provided with location screw arranged in a bore radially against the pin in order to locate the same in any desired axial position.

References Cited

UNITED STATES PATENTS

| | | | |
|---|---|---|---|
| 2,394,612 | 2/1946 | Horne | 77—73.5 |
| 3,200,673 | 8/1965 | Pfeifer | 77—58 |

GERALD A. DOST, *Primary Examiner.*